US009607684B2

(12) United States Patent
Joshi et al.

(10) Patent No.: US 9,607,684 B2
(45) Date of Patent: Mar. 28, 2017

(54) CIRCUIT-LEVEL ABSTRACTION OF MULTIGATE DEVICES USING TWO-DIMENSIONAL TECHNOLOGY COMPUTER AIDED DESIGN

(71) Applicant: International Business Machines Corporation, Armonk, NY (US)

(72) Inventors: Rajiv V. Joshi, Yorktown Heights, NY (US); Keunwoo Kim, Somers, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/993,221

(22) Filed: Jan. 12, 2016

(65) Prior Publication Data

US 2016/0125933 A1   May 5, 2016

Related U.S. Application Data

(63) Continuation of application No. 14/176,740, filed on Feb. 10, 2014, now Pat. No. 9,262,575.

(51) Int. Cl.
*G06F 17/50* (2006.01)
*G11C 11/417* (2006.01)

(52) U.S. Cl.
CPC ........ *G11C 11/417* (2013.01); *G06F 17/5036* (2013.01); *G06F 17/5081* (2013.01); *G06F 2217/10* (2013.01); *G06F 2217/82* (2013.01)

(58) Field of Classification Search
CPC ....................................................... G06F 17/50

USPC ......................................................... 716/115
See application file for complete search history.

(56) References Cited

U.S. PATENT DOCUMENTS

| 6,201,401 B1 | 3/2001 | Hellemans et al. |
| 6,772,035 B2 | 8/2004 | Mouli |
| 7,272,460 B2 | 9/2007 | Akiyama et al. |
| 7,792,595 B1 | 9/2010 | Bomholt et al. |
| 8,601,420 B1 | 12/2013 | Keller et al. |
| 2002/0162086 A1* | 10/2002 | Morgan ............... G06F 17/5045 716/102 |
| 2009/0044158 A1 | 2/2009 | Lilja |
| 2011/0176350 A1* | 7/2011 | Jung ....................... G11C 11/16 365/148 |
| 2013/0060551 A1 | 3/2013 | Joshi et al. |

FOREIGN PATENT DOCUMENTS

WO    WO/0157740 A2    1/2001

OTHER PUBLICATIONS

Zechner et al., "TCAD Calibration of USJ Profiles for Advanced Deep Sub-µm CMOS Processes" Elsevier Science B.V. 2002 pp. 303-308.

(Continued)

*Primary Examiner* — Thuan Do
(74) *Attorney, Agent, or Firm* — Mercedes Hobson

(57) ABSTRACT

A method for predicting a condition in a circuit under design includes obtaining a set comprising first static noise margin curve for the circuit and a second static noise margin curve for the circuit, wherein the second static noise margin curve is complementary to the first static noise margin curve, matching the set to a two-dimensional model of a cell, and predicting the condition in accordance with hardware characterization data corresponding to the cell.

20 Claims, 5 Drawing Sheets

(56) References Cited

OTHER PUBLICATIONS

Kunibmo et al., "TCAD-Prototyping with New Accurate Worst-Case Definition for a 0.2 Micron CMOS-ASIC Process", ieee, 1999 consists of 4 unnumbered pages.

* cited by examiner

CIRCUIT-LEVEL ABSTRACTION OF MULTIGATE DEVICES USING TWO-DIMENSIONAL TECHNOLOGY COMPUTER AIDED DESIGN

FIELD OF THE DISCLOSURE

The present disclosure relates generally to electronic design automation and relates more specifically to developing technology computer aided design models for integrated circuit chip design.

BACKGROUND OF THE DISCLOSURE

Technology computer aided design (TCAD) is a branch of electronic design automation that models semiconductor fabrication (typically referred to as "process TCAD") and semiconductor device operation (typically referred to as "device TAD"). These techniques respectively include the modelling of process steps (e.g., diffusion and ion implantation) and the modelling of electrical device behaviors based on fundamental physics (e.g., the doping profiles of the devices). TCAD may also include the creation of compact models (e.g., SPICE transistor models), which try to capture the electrical behavior of such devices but do not generally derive them from the underlying physics.

The physics and modeling of devices in integrated circuits is dominated by metal-oxide-semiconductor (MOS) and bipolar transistor modeling. However, other devices, such as memory devices, are also important and have different modeling requirements. Physics-driven device modeling is intended to be accurate, but it takes a long time to get the full hardware data for the TCAD models, and is thus not typically fast enough for higher level tools, including circuit simulators such as SPICE. Therefore circuit simulators normally use the more empirical compact models that do not directly model the underlying physics. However, compact models are not accurately modeled from first principles, and so resort is taken to fitting experimental data.

SUMMARY OF THE DISCLOSURE

A method for predicting a condition in a circuit under design includes obtaining a set comprising first static noise margin curve for the circuit and a second static noise margin curve for the circuit, wherein the second static noise margin curve is complementary to the first static noise margin curve, matching the set to a two-dimensional model of a cell, and predicting the condition in accordance with hardware characterization data corresponding to the cell.

Another method for predicting a condition in a circuit under design includes measuring a first set of input voltages at a first node in the circuit and a corresponding first set of output voltages at a second node in the circuit, plotting the first set of input voltages versus the first set of output voltages to generate a first static noise margin curve for the circuit, measuring a second set of input voltages at the second node and a corresponding second set of output voltages at the first node, plotting the second set of input voltages versus the second set of output voltages to generate a second static noise margin curve for the circuit, matching a set comprising the first static noise margin curve and the second static noise margin curve to a two-dimensional model of a cell, unlike an individual transistor, and predicting the condition in accordance with hardware characterization data corresponding to the cell.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one embodiment, the present invention is a method and apparatus for performing circuit-level abstraction of multigate devices using two-dimensional (2D) technology computer aided design (TCAD). In particular, embodiments of the invention use available hardware data to develop accurate TCAD models. These models can be directly applied to design for manufacturability and product circuit design inquiries. This approach can be used to effectively model, for example, direct current (DC) static noise margin (SNM) in static random access memory (SRAM) cells, alternating current (AC) capacitance of SRAM cells, and leakage in SRAM cells and other circuits including logic. It can also be interfaced to other electronic design automation frameworks to facilitate statistical yield analysis. The disclosed approach is quicker, more accurate, and more cost-efficient than existing techniques, particularly in the early stages of integrated circuit (IC) design.

In one embodiment, the invention uses two-dimensional modeling techniques (e.g., 2D TCAD) to match static noise margin curves for a circuit. The resultant model can be mapped to the available hardware data to predict various conditions in the circuit (e.g. voltages, AC capacitance, leakages, etc.).

Figure 1:
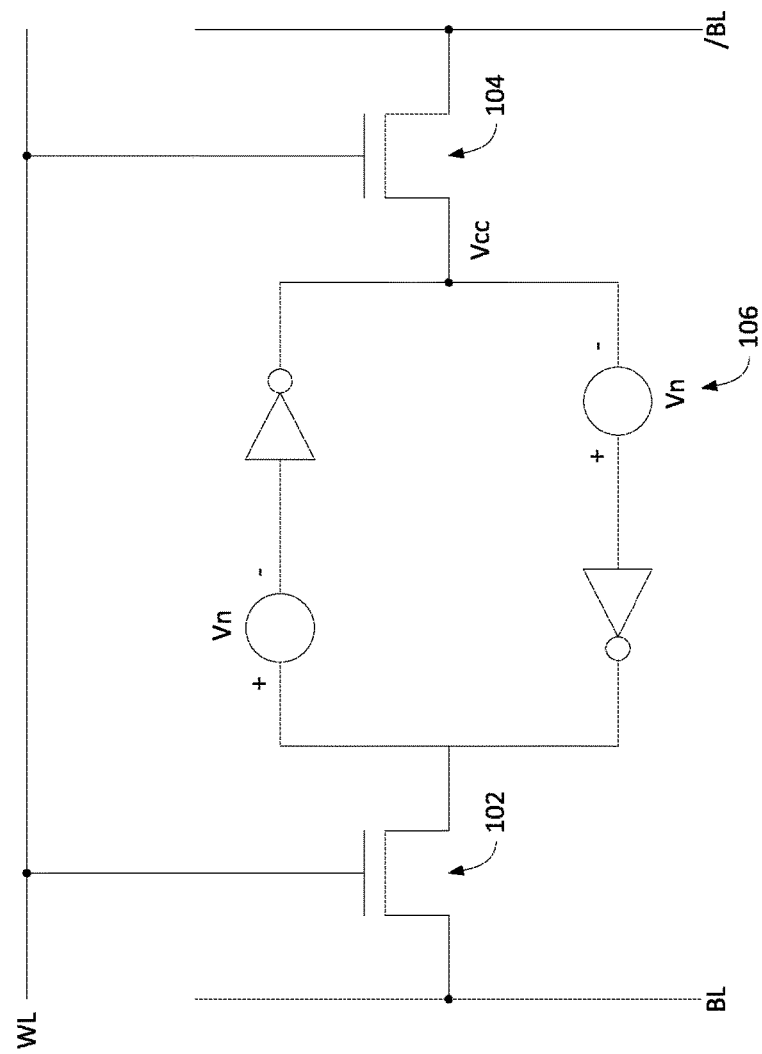
FIG. 1 is a circuit diagram illustrating an exemplary circuit whose conditions may be predicted using embodiments of the present invention.

FIG. 1 is a circuit diagram illustrating an exemplary circuit 100 whose conditions may be predicted using embodiments of the present invention. In one embodiment, the circuit is a cell of a multigate or trigate device (e.g., a FinFET, a carbon nanotube, a tunneling FET, or the like). The cell may comprise, for example, a static random access memory (SRAM) cell of a FinFET. As illustrated, the circuit 100 generally comprises a first node 102, a second node 104, and a pass gate 106. The pass gate 106 selectively passes signals from the first node 102 to the second node 104, or vice versa.

Figure 2:
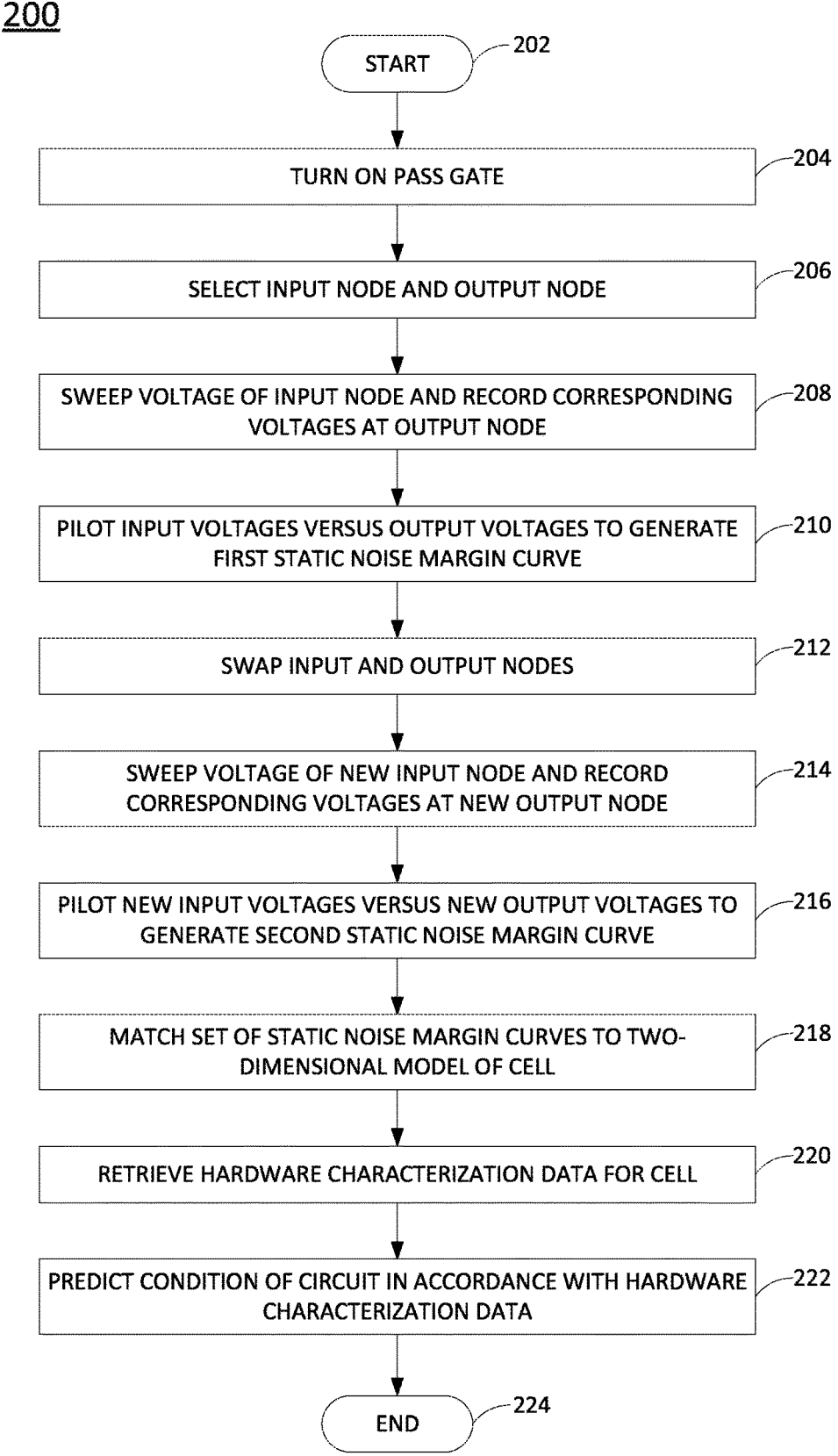
FIG. 2 is a flow diagram illustrating one embodiment of a method for performing circuit-level abstraction.

FIG. 2 is a flow diagram illustrating one embodiment of a method 200 for performing circuit-level abstraction. The method 200 may be performed, for example, by a processor or other device that is tasked with predicting one or more conditions in a circuit. The description of the method 200 makes reference to elements of the circuit 100 illustrated in FIG. 1. However, it will be appreciated that such references are made for illustrative purposes only and do not limit application of the method 200 to specific circuit configurations. In one embodiment, there are two conditions under which the method 200 can be executed: either (1) the pass gate 106 is off (i.e., the wordline WL is off, which is referred to as a "hold state"); or (2) the pass gate 106 is one (i.e., the wordline WL is on, which is referred to as a "read state").

The method 200 begins in step 202. In step 204, the pass gate 106 is turned on. In one embodiment, this is accomplished by holding the bitline of the circuit 100 (denoted as "BL" in FIG. 1) at a constant high value. This, in turn, causes the wordline WL to go high, so that the pass gate 106 is on and so that signals are allowed to pass between the first node 102 and the second node 104. Alternatively in step 204, the pass gate 106 may be turned off. The method 200 proceeds in a similar manner with the pass gate 106 turned off In step 206, one of the first node 102 and the second node 14 is selected as an input node, and the other is selected as an output node. This selection determines the direction in which signals will pass through the pass gate 106. For illustrative purposes, it is assumed that the first node 102 is selected as the input node and the second node 104 is selected as the output node.

In step 208, the voltage of the input node (e.g., first node 102) is swept. That is, the input voltage (Vin) applied to the first node 102 is gradually increased (or decreased), and the corresponding output voltages (Vout) at the second node 104 are recorded. In one embodiment, the voltage of the first node 102 is swept from zero to a supply voltage Vdd (e.g., 0.9 volts).

Figure 3:
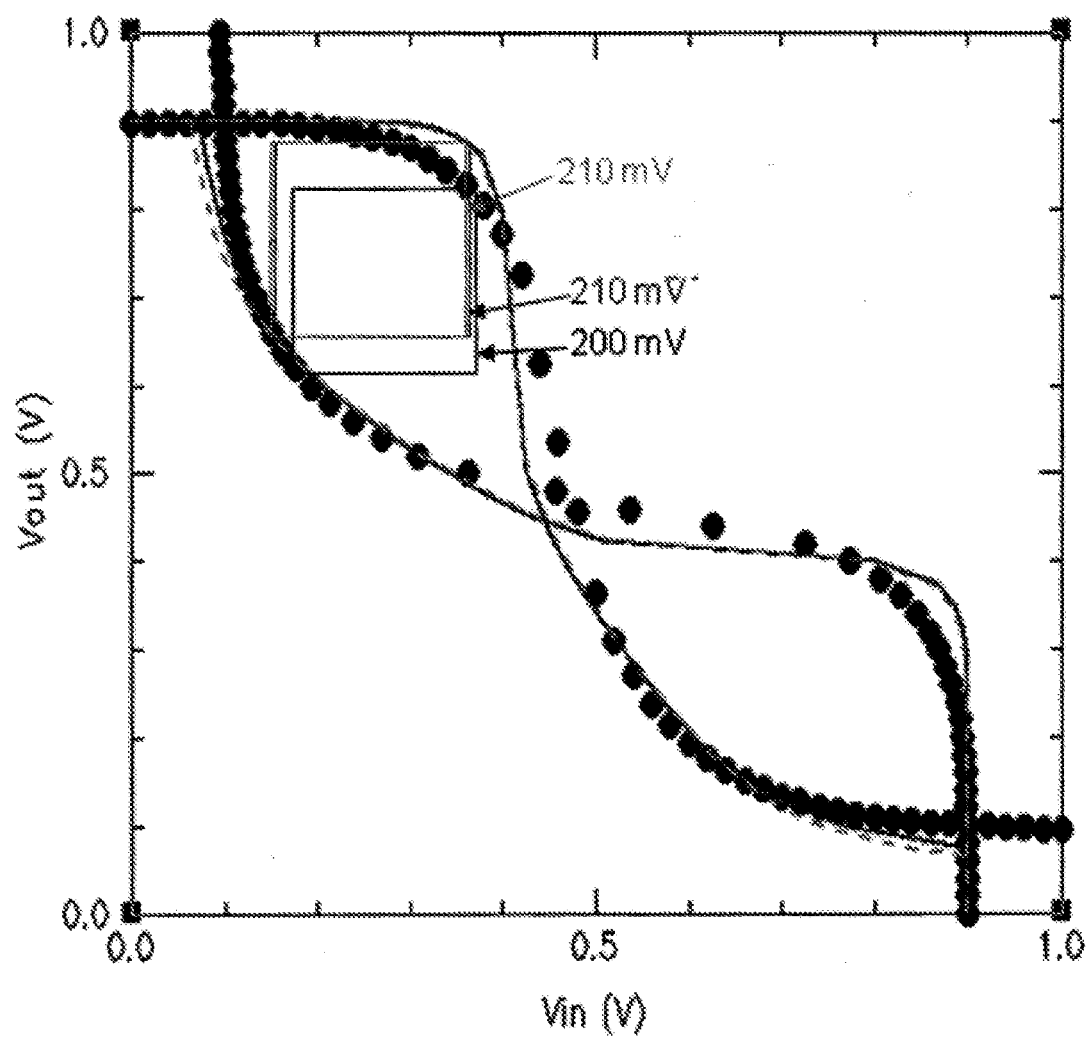
FIG. 3 is a graph plotting the input voltage of the circuit illustrated in FIG. 1 against the output voltage of the circuit.

In step 210, the corresponding input and output voltages, Vin and Vout, that are recorded in step 208 are plotted against each other. This results in a first static noise margin (SNM) curve, as illustrated in FIG. 3 (discussed in further detail below).

In step 212, the first node 102 and the second node 104 are swapped. That is, the second node 104 becomes the input node, while the first node 102 becomes the output node.

In step 214, the voltage of the input node (e.g., now second node 104) is swept. Similarly to step 208, the input voltage (Vin) applied to the second node 104 is gradually increased (or decreased), and the corresponding output voltages (Vout) at the first node 102 are recorded. In one embodiment, the voltage of the second node 104 is swept using the same range used to sweep the first node 102 in step 208 (e.g., from zero to a supply voltage Vdd).

In step 216, the corresponding input and output voltages, Vin and Vout, that are recorded in step 216 are plotted against each other. This results in a second static noise margin (SNM) curve, as illustrated in FIG. 3 (discussed in further detail below).

In step 218, the set of SNM curves generated in steps 210 and 216 is matched to a two-dimensional model (e.g., a 2D TCAD model) of a cell (e.g., a six-transistor cell) by adjusting the work functions and capacitances of the transistors in the model. In one embodiment, the set of SNM curves can be calibrated more closely to the 2D model by adjusting the source and drain resistances of the 2D model FIG. 3, for example, is a graph plotting the input voltage Vin of the circuit 100 against the output voltage Vout of the circuit 100. In particular, FIG. 3 illustrates both the first curve and the second curve discussed above. The first and second curves are illustrated as complementary solid lines in FIG. 3. In addition, the dotted curves in FIG. 3 represent the known set of SNM curves for a particular cell. For instance, the dotted curves may represent the known set of SNM curves associated with a particular cell of a FinFET.

In step 220, the hardware characterization data for the cell to which the circuit 100 is matched in step 218 is retrieved. In step 222, the hardware characterization data is used to predict a condition (e.g. a voltage, an alternating current (AC) capacitance, a leakage, etc.) of the circuit 100.

The method 200 ends in step 222.

The use of 2D TCAD, rather than 3D TCAD which is conventionally used to model devices, allows results to be obtained much more quickly. However, conventional 2D TCAD at the transistor level may not be as accurate as 3D TCAD, and that is why the disclosed approach of capturing the circuit-level model generation is provided. Also, a single SNM curve for a circuit can capture data for an SRAM operating condition, while many IV curves using individual devices are required to properly calibrate the SRAM operating conditions. In addition, a 2D TCAD model can be accurately extracted from a 3D TCAD model by matching parasitics and obtaining an appropriate cut through the 3D device structure. Using such accurate 2D TCAD models derived from 3D TCAD, a FinFET SRAM circuit can be modeled in less than ten minutes, whereas modeling the same device in 3D TCAD can take 30 hours or more. Moreover, once the 2D model has been mapped to the hardware data, this mapping can be used to predict multiple conditions in the circuit being analyzed.

Figure 4:
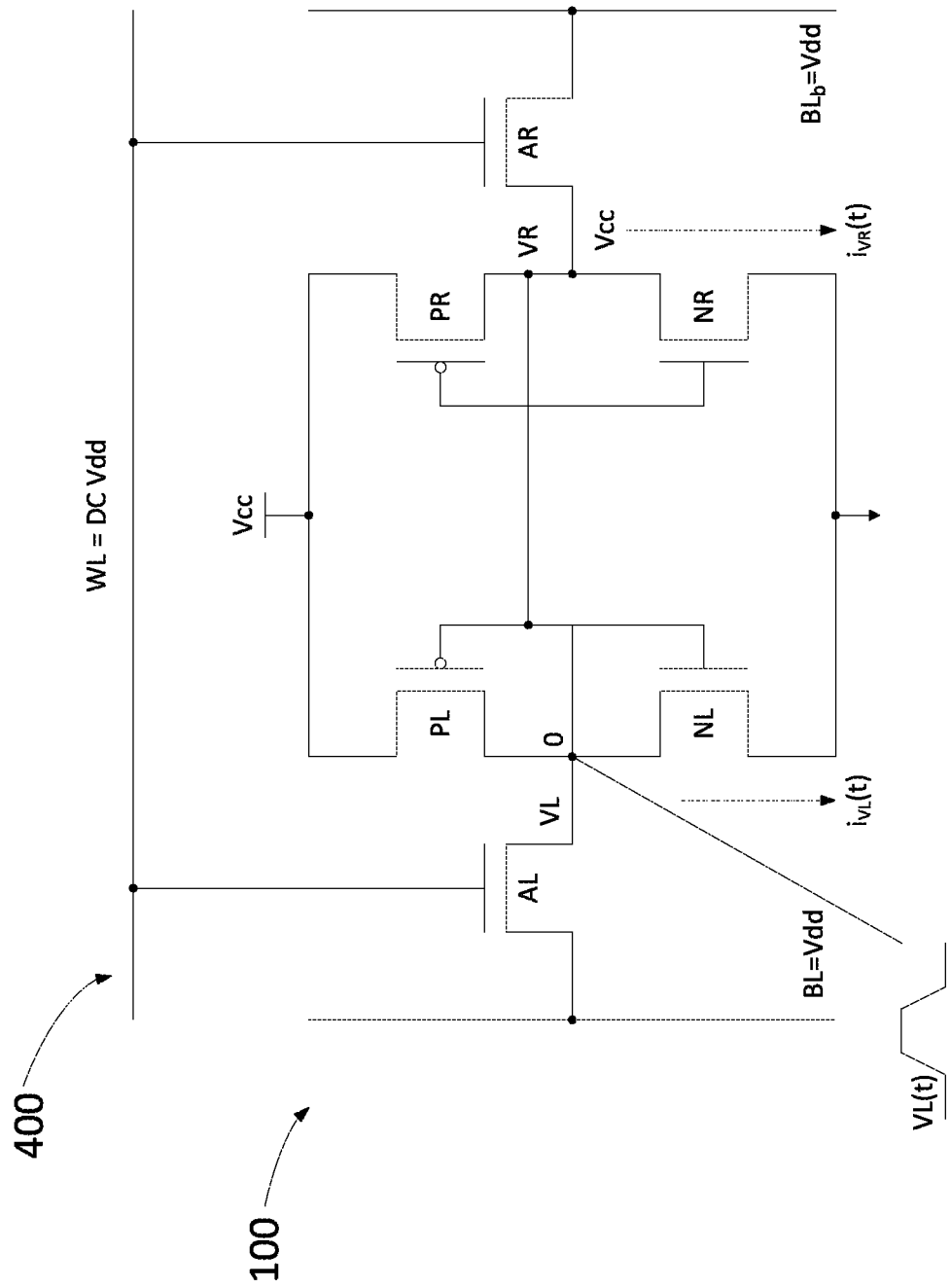
FIG. 4 is a circuit diagram illustrating a second exemplary circuit whose conditions can be predicted using embodiments of the present invention.

FIG. 4, for instance, is a circuit diagram illustrating a second exemplary circuit 400 whose conditions can be predicted using embodiments of the present invention. The circuit 400 may comprise, for example, an SRAM cell. As illustrated, the circuit 400 comprises a plurality of transistors; in this case, six transistors (labeled as AL, PL, NL, AR, PR, and NR in FIG. 4). It will be appreciated, however, that a circuit may comprise any number of transistors without departing from the scope of the present invention.

Once a 2D model matching the hardware characterization is obtained for DC (e.g., in accordance with the method 200 described above), one can excite (i.e., switch on and off) an internal node of the model, obtain the voltage and current at the node, and calculate the AC capacitance accordingly. For instance, the AC capacitance in an SRAM cell can be captured by the relationship between VL(t) versus $i_{VL(t)}$ for the left node and VR(t) versus ivR(t) for the right node. The internal capacitance (CL) for the left node can be calculated as simply $CL=i_{VL(t)}/d(VL(t))/dt$, where $i_{VL(t)}$ is a leakage current through the left node and VL(t) is a voltage applied to the left node. The internal capacitance for the right node can be calculated similarly. The calculated capacitance can be validated with hardware measurements.

Figure 5:
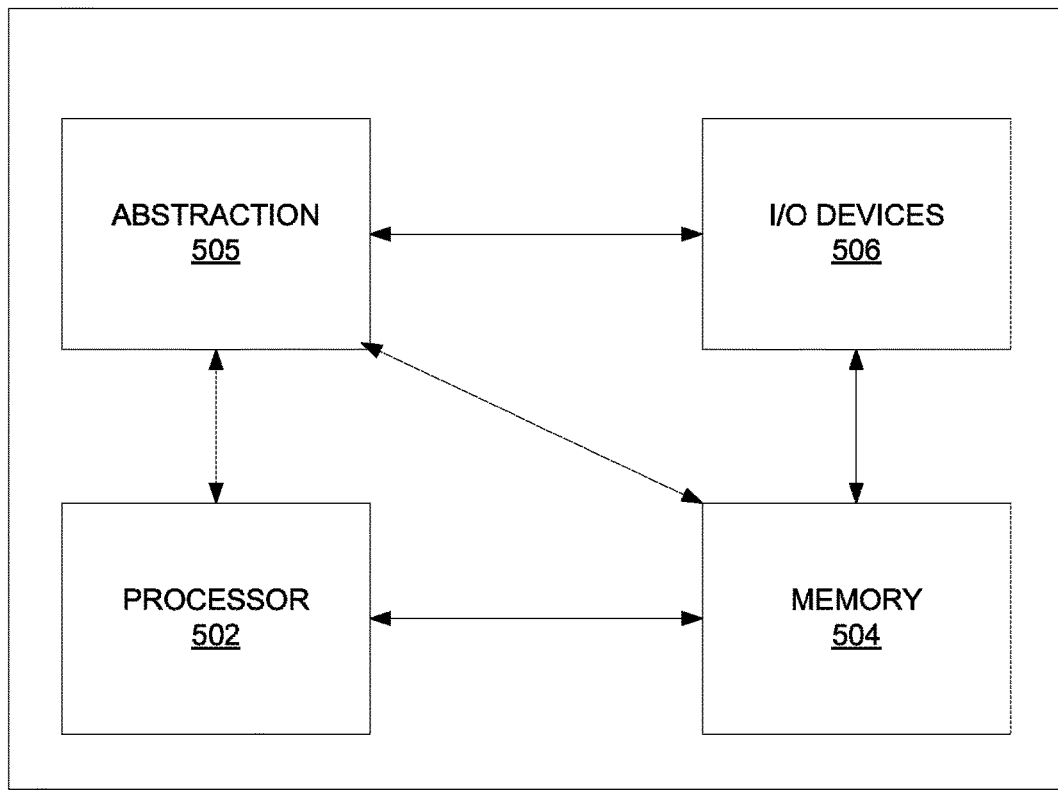
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Therefore, in one embodiment, a general purpose computing device 500 comprises a processor 502, a memory 504, an abstraction module 505, and various input/output (I/O) devices 506 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., abstraction module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the abstraction module 505 for circuit-level abstraction of multigate devices using two-dimensional 2D TCAD described herein with reference to the preceding Figures can be stored on a tangible or non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A non-transitory machine-readable storage medium encoded with instructions executable by a processor, the machine-readable storage medium comprising:
   instructions for generating a first set comprising a first static noise margin curve for a circuit under design and a second static noise margin curve for the circuit, wherein each of the first static noise margin curve and the second static noise margin curve plots a voltage of an input node of the circuit against a corresponding voltage of an output node of the circuit;
   instructions for adjusting a parameter of a stored model of a cell, wherein the stored model is associated with hardware characterization data and with a second set comprising a third static noise margin curve corresponding to the cell and a fourth static noise margin curve corresponding to the cell, wherein each of the third static noise margin curve and the fourth static noise margin curve plots a voltage of an input node of the cell against a corresponding voltage of an output node of the cell, and wherein the adjusting is performed using a two-dimensional device simulation tool until the second set resembles the first set; and
   instructions for predicting a condition of the circuit in accordance with the hardware characterization data.

2. The non-transitory machine-readable storage medium of claim 1, wherein the instructions for generating comprise:
   instructions for measuring a first set of input voltages at a first node in the circuit and a corresponding first set of output voltages at a second node in the circuit;
   instructions for plotting the first set of input voltages versus the first set of output voltages to generate the first static noise margin curve for the circuit;
   instructions for measuring a second set of input voltages at the second node and a corresponding second set of output voltages at the first node; and
   instructions for plotting the second set of input voltages versus the second set of output voltages to generate the second static noise margin curve for the circuit.

3. The non-transitory machine-readable storage medium of claim 2, further comprising:
   instructions for turning a pass gate positioned between the first node and the second node on prior to the measuring the first set of input voltages and the first set of output voltages.

4. The non-transitory machine-readable storage medium of claim 2, further comprising:
   instructions for turning a pass gate positioned between the first node and the second node off prior to the measuring the first set of input voltages and the first set of output voltages.

5. The non-transitory machine-readable storage medium of claim 2, wherein the first set of input voltages and the second set of input voltages each comprises a range of voltages ranging from zero to a supply voltage.

6. The non-transitory machine-readable storage medium of claim 1, wherein the two-dimensional device simulation tool is two-dimensional technology computer aided design.

7. The non-transitory machine-readable storage medium of claim 1, wherein the cell is a static random access memory cell.

8. The non-transitory machine-readable storage medium of claim 1, wherein the parameter comprises a capacitance of a transistor in the cell.

9. The non-transitory machine-readable storage medium of claim 1, wherein the parameter comprises source and drain resistances of the cell.

10. The non-transitory machine-readable storage medium of claim 1, wherein the condition is a voltage.

11. The non-transitory machine-readable storage medium of claim 1, wherein the condition is an alternating current capacitance.

12. The non-transitory machine-readable storage medium of claim 11, wherein the instructions for predicting comprise:
    instructions for exciting a node in the stored model using the two-dimensional device simulation tool;
    instructions for recording a voltage and a set of currents at the node, in response to the exciting; and
    instructions for deriving the capacitance in accordance with the voltage and the set of currents.

13. The non-transitory machine-readable storage medium of claim 1, wherein the condition is a leakage.

14. The non-transitory machine-readable storage medium of claim 1, wherein the circuit comprises a portion of a multigate device.

15. The non-transitory machine-readable storage medium of claim 14, wherein the multigate device is a FinFET.

16. The non-transitory machine-readable storage medium of claim 15, wherein the instructions for predicting comprise:
    instructions for exciting a node in the stored model using the two-dimensional device simulation tool;
    instructions for recording a voltage and a set of currents at the node, in response to the exciting; and
    instructions for deriving the capacitance in accordance with the voltage and the set of currents.

17. The non-transitory machine-readable storage medium of claim 1, wherein the instructions for predicting comprise instructions for estimating an internal capacitance of a node in the circuit as $i_{V(t)}/d(V(t))/dt$, where $i_{V(t)}$ is a leakage current through the node and $V(t)$ is a voltage applied to the node.

18. A non-transitory machine-readable storage medium encoded with instructions executable by a processor, the machine-readable storage medium comprising:

instructions for measuring a first set of input voltages at a first node in a circuit under design and a corresponding first set of output voltages at a second node in the circuit;

instructions for plotting the first set of input voltages versus the first set of output voltages to generate a first static noise margin curve for the circuit;

instructions for measuring a second set of input voltages at the second node and a corresponding second set of output voltages at the first node;

instructions for plotting the second set of input voltages versus the second set of output voltages to generate a second static noise margin curve for the circuit;

instructions for adjusting a parameter of a stored model of a cell, wherein the stored model is associated with hardware characterization data and with a second pair comprising a third static noise margin curve corresponding to the cell and a fourth static noise margin curve corresponding to the cell, wherein each of the third static noise margin curve and the fourth static noise margin curve plots a voltage of an input node of the cell against a corresponding voltage of an output node of the cell, and wherein the adjusting is performed using a two-dimensional device simulation tool until the second pair resembles a first pair comprising the first static noise margin curve and the second static noise margin curve; and instructions for predicting a condition of the circuit in accordance with the hardware characterization data.

19. The non-transitory machine-readable storage medium of claim 18, wherein the two-dimensional device simulation tool is two-dimensional technology computer aided design.

20. The non-transitory machine-readable storage medium of claim 18, wherein the parameter comprises a capacitance of a transistor in the cell.

* * * * *